US012435643B2

(12) United States Patent
Millhaem et al.

(10) Patent No.: US 12,435,643 B2
(45) Date of Patent: Oct. 7, 2025

(54) METHODS OF CLEANING A COMPONENT WITHIN A TURBINE ENGINE

(71) Applicant: General Electric Company, Schenectady, NY (US)

(72) Inventors: Michael Robert Millhaem, Cincinnati, OH (US); Nicole Jessica Tibbetts, Delanson, NY (US); Byron Andrew Pritchard, Jr., Loveland, OH (US); Bernard Patrick Bewlay, Niskayuna, NY (US); Keith Anthony Lauria, Wells, NY (US); Ambarish Jayant Kulkarni, Glenville, NY (US); Mark Rosenzweig, West Chester, OH (US); Martin Matthew Morra, Glenville, NY (US); Timothy Mark Sambor, Mason, OH (US); Andrew James Jenkins, Cardiff (GB)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/135,378

(22) Filed: Apr. 17, 2023

(65) Prior Publication Data

US 2023/0250731 A1    Aug. 10, 2023

Related U.S. Application Data

(60) Continuation of application No. 17/010,309, filed on Sep. 2, 2020, now Pat. No. 11,649,735, which is a (Continued)

(51) Int. Cl.
*F01D 25/00* (2006.01)
*B08B 3/00* (2006.01)
(Continued)

(52) U.S. Cl.
CPC ............ *F01D 25/002* (2013.01); *B08B 3/003* (2013.01); *B08B 3/08* (2013.01); *B08B 3/14* (2013.01);
(Continued)

(58) Field of Classification Search
CPC ..................................................... F01D 25/002
See application file for complete search history.

(56) References Cited

U.S. PATENT DOCUMENTS 4,170,489 A * 10/1979 Magnus ................ F01D 25/002
134/22.12
4,713,120 A    12/1987 Hodgens, II
(Continued)

FOREIGN PATENT DOCUMENTS

CN         1050781 C     3/2000
CN         203370761 U    1/2014
(Continued)

OTHER PUBLICATIONS

English Machine Translation of WO-2009129788-A2.*
(Continued)

*Primary Examiner* — Kaj K Olsen
*Assistant Examiner* — Pradhuman Parihar
(74) *Attorney, Agent, or Firm* — Fitch, Even, Tabin & Flannery LLP (57) ABSTRACT

A method of cleaning a component within a turbine that includes disassembling the turbine engine to provide a flow path to an interior passageway of the component from an access point. The component has coked hydrocarbons formed thereon. The method further includes discharging a flow of cleaning solution towards the interior passageway from the access point, wherein the cleaning solution is configured to remove the coked hydrocarbons from the component.

16 Claims, 10 Drawing Sheets

Related U.S. Application Data division of application No. 15/498,141, filed on Apr. 26, 2017, now abandoned.

(51) Int. Cl.
*B08B 3/08* (2006.01)
*B08B 3/14* (2006.01)
*B08B 9/00* (2006.01)
*B08B 9/032* (2006.01)
*B64F 5/30* (2017.01)
*F01D 25/32* (2006.01)
*F02C 7/22* (2006.01)
*F23R 3/28* (2006.01)

(52) U.S. Cl.
CPC .............. *B08B 9/00* (2013.01); *B08B 9/0326* (2013.01); *F01D 25/32* (2013.01); *F02C 7/222* (2013.01); *F23R 3/28* (2013.01); *B64F 5/30* (2017.01); *F05D 2220/32* (2013.01); *F05D 2230/70* (2013.01); *F05D 2230/72* (2013.01); *F23R 2900/00019* (2013.01)

(56) References Cited

U.S. PATENT DOCUMENTS

| | | | |
|---|---|---|---|
| 5,018,355 | A | 5/1991 | Foster |
| 5,090,205 | A | 2/1992 | Foster |
| 5,339,845 | A | 8/1994 | Huddas |
| 6,216,439 | B1 | 4/2001 | Nakamoto |
| 6,263,534 | B1 | 7/2001 | McCann |
| 6,311,704 | B1 | 11/2001 | Foster |
| 6,478,033 | B1 | 11/2002 | Foster |
| 7,033,979 | B2 | 4/2006 | Herwig |
| 7,571,735 | B2 | 8/2009 | Wagner |
| 7,703,272 | B2 | 4/2010 | Wagner |
| 7,712,301 | B1 | 5/2010 | Wagner |
| 7,849,878 | B2 | 12/2010 | Kohler |
| 7,883,674 | B2 | 2/2011 | Huang |
| 8,028,936 | B2 | 10/2011 | McDermott |
| 8,152,934 | B2 | 4/2012 | Lee |
| 8,206,488 | B2 | 6/2012 | Mantkowski |
| 8,277,647 | B2 | 10/2012 | Rice |
| 8,303,243 | B2 | 11/2012 | Fish |
| 8,377,232 | B2 | 2/2013 | Myers |
| 8,635,849 | B2 | 1/2014 | Tassone |
| 8,920,579 | B2 | 12/2014 | Liedtke |
| 8,998,567 | B2 | 4/2015 | Scipio |
| 9,016,293 | B2 | 4/2015 | Battaglioli |
| 9,028,618 | B2 | 5/2015 | Battaglioli |
| 9,127,234 | B2 | 9/2015 | Hughes |
| 9,138,782 | B2 | 9/2015 | Dorshimer |
| 9,187,700 | B2 | 11/2015 | Huang |
| 9,492,906 | B2 | 11/2016 | Jürgen |
| 9,739,168 | B2 | 8/2017 | Ekanayake |
| 9,951,647 | B2 | 4/2018 | Rawson |
| 10,364,699 | B2 | 7/2019 | Saenz |
| 10,428,683 | B2 | 10/2019 | Eriksen |
| 10,634,004 | B2 | 4/2020 | Giljohann |
| 10,669,885 | B2 | 6/2020 | Pecchiol |
| 10,683,807 | B2 | 6/2020 | McMasters |
| 10,920,181 | B2 | 2/2021 | Martin |
| 11,649,735 | B2 * | 5/2023 | Millhaem ............. F01D 25/002 134/18 |
| 2006/0048796 | A1 | 3/2006 | Asplund |
| 2006/0073348 | A1 | 4/2006 | Farmer |
| 2006/0254250 | A1 | 11/2006 | Dambrine |
| 2007/0062201 | A1 | 3/2007 | Reback |
| 2007/0095364 | A1 | 5/2007 | Watt |
| 2008/0149141 | A1 | 6/2008 | Sales |
| 2008/0250769 | A1 | 10/2008 | Wagner |
| 2009/0084411 | A1 | 4/2009 | Woodcock |
| 2009/0255102 | A1 | 10/2009 | McMasters |
| 2009/0255116 | A1 | 10/2009 | McMasters |
| 2009/0256007 | A1 | 10/2009 | McMasters |
| 2010/0037924 | A1 | 2/2010 | Gebhardt |
| 2010/0108107 | A1 | 5/2010 | Mantkowski |
| 2010/0116292 | A1 | 5/2010 | Wagner |
| 2010/0147330 | A1 | 6/2010 | Kohler |
| 2012/0167547 | A1 | 7/2012 | Zhang |
| 2013/0074879 | A1 | 3/2013 | Battaglioli |
| 2015/0159557 | A1 | 6/2015 | Scipio |
| 2015/0233263 | A1 | 8/2015 | Battaglioli |
| 2015/0285094 | A1 | 10/2015 | Tibbetts |
| 2016/0010497 | A1 | 1/2016 | Griffiths |
| 2016/0032761 | A1 | 2/2016 | Griffiths |
| 2016/0067750 | A1 | 3/2016 | Griffiths |
| 2016/0076456 | A1 | 3/2016 | Ekanayake |
| 2016/0186602 | A1 | 6/2016 | Saenz |
| 2018/0094538 | A1 * | 4/2018 | Tibbetts ................... F02C 3/04 |
| 2018/0216036 | A1 | 8/2018 | Tibbetts |
| 2018/0237163 | A1 | 8/2018 | Bewlay |
| 2019/0323378 | A1 | 10/2019 | Tibbetts |
| 2020/0400037 | A1 | 12/2020 | Millhaem |
| 2021/0108537 | A1 | 4/2021 | Rigg |
| 2021/0317752 | A1 | 10/2021 | Deja |

FOREIGN PATENT DOCUMENTS

| | | | |
|---|---|---|---|
| CN | 103639156 | B | 7/2015 |
| CN | 105436127 | A | 3/2016 |
| DE | 102008047493 | | 4/2010 |
| DE | 102013202616 | A1 | 8/2014 |
| DE | 102015006330 | | 11/2016 |
| EP | 1489269 | A2 | 12/2004 |
| EP | 1574675 | A2 | 9/2005 |
| EP | 1903188 | | 3/2008 |
| EP | 1908928 | | 4/2008 |
| EP | 1914010 | | 4/2008 |
| EP | 1967295 | | 9/2008 |
| EP | 2052792 | | 4/2009 |
| EP | 2275648 | | 1/2011 |
| EP | 2286933 | A1 | 2/2011 |
| EP | 2353739 | A1 | 8/2011 |
| EP | 3061923 | | 8/2016 |
| EP | 3061923 | A1 | 8/2016 |
| EP | 3153604 | A1 | 4/2017 |
| WO | WO-2009129788 | A2 * | 10/2009 ........... F01D 25/002 |
| WO | 2020022474 | A1 | 1/2020 |
| WO | 2020030516 | A1 | 2/2020 |

OTHER PUBLICATIONS

Huang et al., In-Situ Continuous Coke Deposit Removal by Catalytic Steam Gasification for Fuel-Cooled Thermal Management, Journal of Engineering for Gas Turbines and Power, vol. 134, Oct. 2012, 8 Pages.

U.S. Appl. No. 17/010,309; Notice of Allowance and Fees Due (PTOL-85) mailed Jan. 6, 2023; (pp. 1-12).

U.S. Appl. No. 17/010,309; Notice of Allowance and Fees Due (PTOL-85) mailed Jan. 30, 2023; (pp. 1-9).

Wickham et al., High Heat Flux Surface Coke Deposition and Removal Assessment, Technical Paper, Air Force Research Laboratory, Edwards AFB, Jan. 2015, California, 21 Pages.

* cited by examiner

METHODS OF CLEANING A COMPONENT WITHIN A TURBINE ENGINE

CROSS REFERENCE TO RELATED APPLICATIONS

This application claims priority to and is a continuation application of U.S. patent application Ser. No. 17/010,309, filed Sep. 2, 2020, now U.S. Pat. No. 11,649,735, issued May 16, 2023, which is a divisional application of U.S. patent application Ser. No. 15/498,141, filed Apr. 26, 2017, both of which are incorporated by reference in their entirety herein.

BACKGROUND

The present disclosure relates generally to turbine engines and, more specifically, to cleaning coked hydrocarbons from a component within a turbine engine.

In a gas turbine engine, air is pressurized in a compressor, mixed with fuel in a combustor, and ignited such that hot combustion gas is generated. In at least some known turbine engines, ignition of the air and fuel can result in oxidation and partial decomposition of the mixture, thereby resulting in coking within the turbine engine. More specifically, coking is a process that forms hard deposits within a fuel supply system of the turbine engine, for example. The hard deposits also form from other hydrocarbon-based substances in other areas of the turbine engine, such as in a fan assembly of the turbine engine. Excess buildup of the hard deposits in the turbine engine can clog the components of the turbine engine, and necessitate service of the turbine engine after prolonged use. For example, servicing the fuel supply system generally includes detaching the turbine engine from an airframe, removing fuel nozzles of the fuel supply system from the turbine engine, replacing the fuel nozzles with different fuel nozzles, transferring the removed fuel nozzles to another location for cleaning, and reattaching the turbine engine to the airframe. As such, a stockpile of unused turbine engine components is maintained in the event a turbine engine is scheduled for service. In addition, removing and replacing fuel nozzles in the fuel supply system can be a time-consuming and laborious task. Moreover, if combusted engine oil is trapped outside of the fuel supply system, such as in the fan assembly, critical ventilation can be blocked, resulting in unscheduled engine removal and significant disassembly to service the components at a piece-part level.

BRIEF DESCRIPTION

In one aspect, a method of cleaning a component within a turbine engine is provided. The method includes disassembling the turbine engine to provide a flow path to an interior passageway of the component from an access point. The component has coked hydrocarbons formed thereon. The method further includes discharging a flow of cleaning solution towards the interior passageway from the access point, wherein the cleaning solution is configured to remove the coked hydrocarbons from the component.

In one embodiment, which may include at least a portion of the subject matter of any of the preceding and/or following examples and aspects, disassembling the turbine engine includes disassembling the turbine engine when the turbine engine is coupled to an airframe.

In one embodiment, which may include at least a portion of the subject matter of any of the preceding and/or following examples and aspects, disassembling the turbine engine includes disassembling a fuel manifold to define an inlet port within the fuel manifold, wherein the inlet port defines the access point.

In one embodiment, which may include at least a portion of the subject matter of any of the preceding and/or following examples and aspects, discharging a flow of cleaning solution includes discharging the flow of cleaning solution towards the interior passageway in a pulsed interval having a discharge time defined within a range between about 5 seconds and about 120 seconds.

In one embodiment, which may include at least a portion of the subject matter of any of the preceding and/or following examples and aspects, discharging a flow of cleaning solution includes discharging the flow of cleaning solution towards the interior passageway in at least a first pulsed interval and a second pulsed interval, wherein a residence time is defined between the first pulsed interval and the second pulsed interval.

In one embodiment, which may include at least a portion of the subject matter of any of the preceding and/or following examples and aspects, the method further includes defining the residence time within a range between about 2 minutes and about 30 minutes.

In one embodiment, which may include at least a portion of the subject matter of any of the preceding and/or following examples and aspects, discharging a flow of cleaning solution comprises heating the cleaning solution to a temperature defined within a range between about 30° C. and 95° C.

In one embodiment, which may include at least a portion of the subject matter of any of the preceding and/or following examples and aspects, the method further includes disassembling the turbine engine to define a drainage port in the turbine engine, wherein the cleaning solution is drained from the turbine engine through the drainage port.

In one embodiment, which may include at least a portion of the subject matter of any of the preceding and/or following examples and aspects, the method further includes discharging a flow of rinsing solution towards the interior passageway from the access point.

In another aspect, a method of cleaning a component within a turbine engine is provided. The method includes disassembling the turbine engine to provide a flow path to an interior passageway of the component from an access point, wherein the component has coked hydrocarbons formed thereon, and filling a volume of the interior passageway with an amount of cleaning solution. The cleaning solution is configured to remove the coked hydrocarbons from the component. The method further includes holding the amount of cleaning solution within the interior passageway for a predetermined residence time.

In one embodiment, which may include at least a portion of the subject matter of any of the preceding and/or following examples and aspects, disassembling the turbine engine includes disassembling a fan assembly of the turbine engine to define a first open end of a fan midshaft of the turbine engine, wherein the first open end defines the access point.

In one embodiment, which may include at least a portion of the subject matter of any of the preceding and/or following examples and aspects, the fan midshaft includes a second open end, and the method further includes sealing the second open end prior to discharging the flow of cleaning solution towards the interior passageway.

In one embodiment, which may include at least a portion of the subject matter of any of the preceding and/or following examples and aspects, sealing the second open end includes positioning a plug within the interior passageway of the component proximate the second open end, wherein the plug is insertable through the first open end of the fan midshaft when in a first operational mode, and actuating the plug into a second operational mode from the first operational mode, wherein the plug is configured to seal the second open end when in the second operational mode.

In one embodiment, which may include at least a portion of the subject matter of any of the preceding and/or following examples and aspects, filling a volume of the interior passageway includes filling the volume with the cleaning solution including a foaming agent.

In one embodiment, which may include at least a portion of the subject matter of any of the preceding and/or following examples and aspects, holding the amount of cleaning solution comprises holding the amount of cleaning solution for the predetermined residence time defined within a range between about 30 minutes and about 8 hours.

In yet another aspect, a method of cleaning a component within a turbine engine is provided. The method includes disassembling the turbine engine to define an access point to the component. The component has coked hydrocarbons formed thereon. The method further includes discharging a flow of cleaning solution towards the component from the access point, wherein the cleaning solution is configured to remove the coked hydrocarbons from the component, and wherein the cleaning solution includes at least one of citric acid or glycolic acid.

In one embodiment, which may include at least a portion of the subject matter of any of the preceding and/or following examples and aspects, disassembling the turbine engine includes disassembling the turbine engine when the turbine engine is coupled to an airframe.

In one embodiment, which may include at least a portion of the subject matter of any of the preceding and/or following examples and aspects, disassembling the turbine engine includes disassembling the turbine engine to provide access to a fuel nozzle of the turbine engine.

In one embodiment, which may include at least a portion of the subject matter of any of the preceding and/or following examples and aspects, discharging a flow of cleaning solution includes discharging the flow of cleaning solution that further includes a foaming agent.

In one embodiment, which may include at least a portion of the subject matter of any of the preceding and/or following examples and aspects, the method further includes disassembling a fuel manifold to define an inlet port within the fuel manifold, wherein the inlet port defines the access point, and discharging the flow of cleaning solution through the inlet port and towards the component.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to cleaning coked hydrocarbons from a component within a turbine engine. More specifically, the systems and methods described herein facilitate cleaning the turbine engine without, for example, having to detach the turbine engine from the airframe, and without having to remove the component to be cleaned from the turbine engine. In contrast, the systems and methods described herein provide a cleaning solution to the turbine engine via an access point, which is defined by disassembling a portion of the turbine engine while still coupled to the airframe. For example, in one embodiment, fuel nozzles of the turbine engine have coked hydrocarbons formed thereon, and the turbine engine is disassembled such that cleaning fluid may be provided to the fuel nozzles from a single access point. As such, the time and effort for disassembling and cleaning components of the turbine engine are reduced, thereby reducing the amount of time for returning a refurbished turbine engine to service.

While the following embodiments are described in the context of a turbofan engine, it should be understood that the systems and methods described herein are also applicable to turboprop engines, turboshaft engines, turbojet engines, and ground-based turbine engines, for example.

Figure 1:
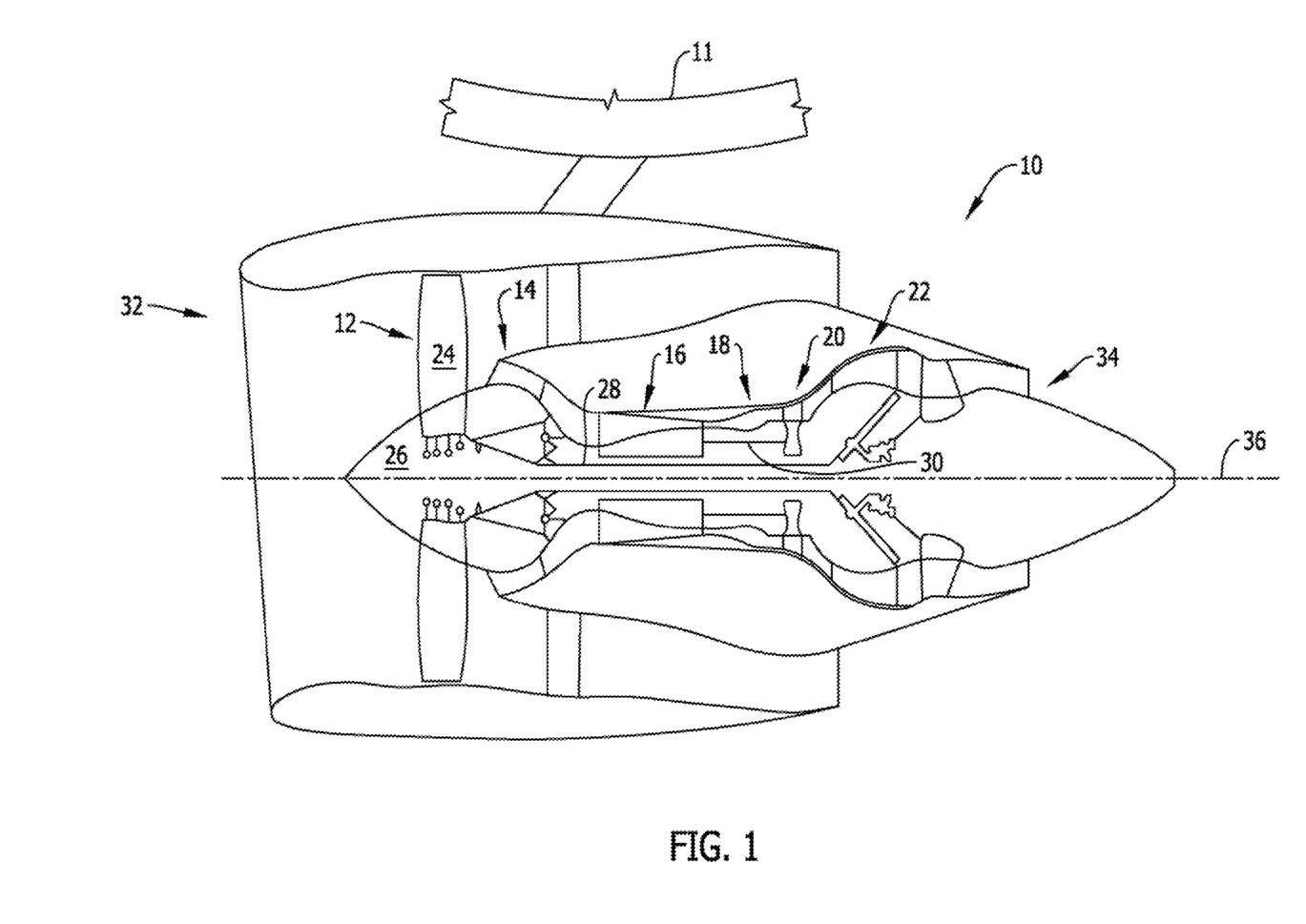
FIG. 1 is a schematic illustration of an exemplary turbine engine.

FIG. 1 is a schematic diagram of an exemplary turbine engine 10 coupled to an airframe 11. Turbine engine 10 includes a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Fan assembly 12 includes an array of fan blades 24 extending radially outward from a rotor disk 26. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. Turbine engine 10 has an intake 32 and an exhaust 34. Turbine engine 10 further includes a centerline 36 about which fan assembly 12, booster compressor assembly 14, high-pressure compressor assembly 16, and turbine assemblies 20 and 22 rotate.

In operation, air entering turbine engine 10 through intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 10 via exhaust 34.

Figure 2:
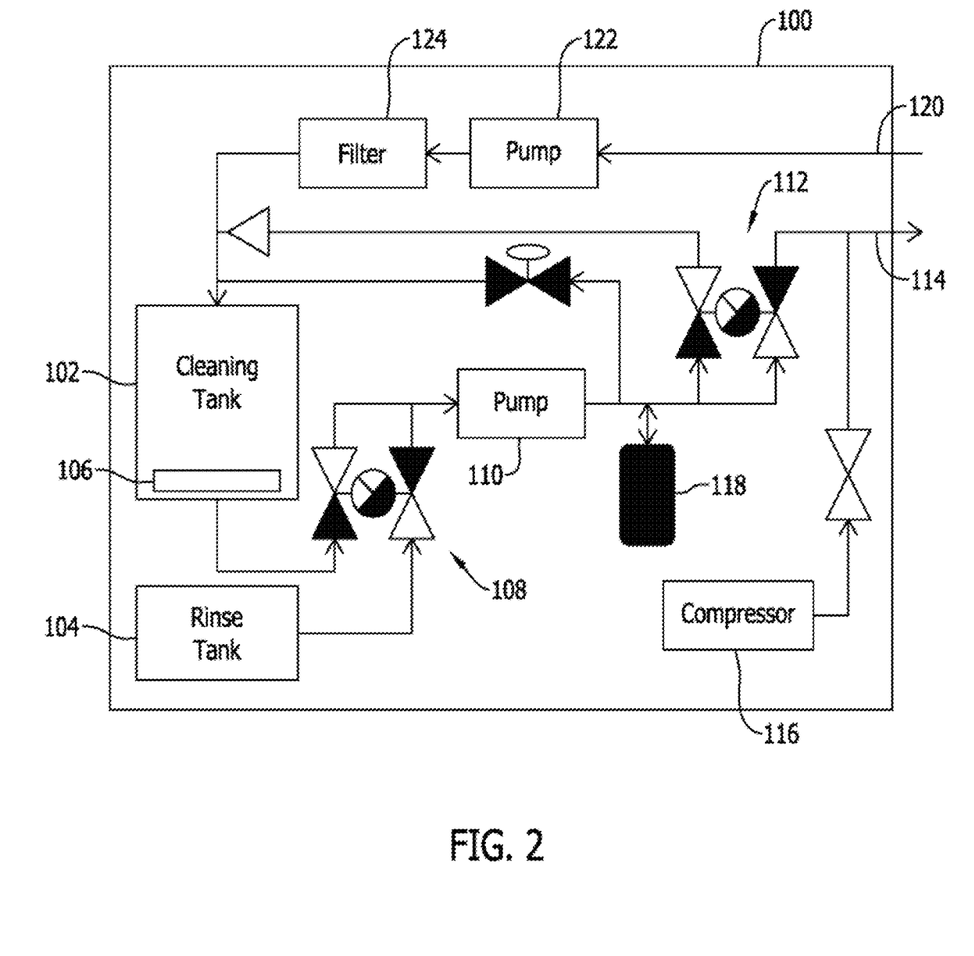
FIG. 2 is a schematic illustration of an exemplary fluid delivery system that may be used to clean the turbine engine shown in FIG. 1.

FIG. 2 is a schematic illustration of an exemplary fluid delivery system 100 that may be used to clean turbine engine 10 (shown in FIG. 1). In the exemplary embodiment, fluid delivery system 100 is embodied as a mobile flight line cart including a plurality of components that, when used in combination, facilitate providing a flow of cleaning solution to turbine engine 10. Fluid delivery system 100 includes a cleaning tank 102 that stores the cleaning solution therein, and a rinse tank 104 that stores a rinsing solution therein, such as deionized water. Cleaning tank 102 includes a heater 106 positioned therein for heating the cleaning solution to a predetermined temperature. Heater 106 facilitates heating the cleaning solution to any temperature that enables the systems and methods to function as described herein. In one embodiment, heater 106 heats the cleaning solution to a temperature defined within a range between about 30° C. and about 95° C. before being discharged towards turbine engine 10.

Cleaning tank 102 and rinse tank 104 are coupled in flow communication with a first valve assembly 108 that is selectively operable to provide either the cleaning solution or the rinsing solution to turbine engine 10. More specifically, fluid delivery system 100 includes a first pump 110 coupled in flow communication with first valve assembly 108. First pump 110 discharges either the cleaning solution or the rinsing solution towards a second valve assembly 112, which is selectively operable to discharge the selected solution towards turbine engine 10 via a discharge line 114. In some embodiments, fluid delivery system 100 includes a compressor 116 coupled in flow communication with discharge line 114, and compressor 116 is selectively operable to facilitate providing purge air through discharge line 114 when draining solution from turbine engine 10. Fluid delivery system 100 also includes an accumulator 118 coupled between first pump 110 and second valve assembly 112. Accumulator 118 modulates the flow pulses discharged from first pump 110 to provide a steady flow to second valve assembly 112.

In one embodiment, fluid delivery system 100 further includes a receiving line 120 coupled in flow communication with turbine engine 10. As will be explained in more detail below, receiving line 120 receives fluid that has been channeled towards turbine engine 10 through discharge line 114, circulated through turbine engine 10, and subsequently drained from turbine engine 10. In the exemplary embodiment, fluid delivery system 100 includes a second pump 122 coupled in flow communication with receiving line 120. When used cleaning solution is channeled through receiving line 120, second pump 122 induces flow of the used cleaning solution from turbine engine 10 and discharges the used cleaning solution towards a filter 124. In some embodiments, filter 124 removes contaminants from the used cleaning solution, thereby forming reconditioned cleaning solution, which is then discharged into cleaning tank 102 for further use.

Fluid delivery system 100 may use any cleaning solution to clean turbine engine 10 that enables the systems and methods to function as described herein. In the exemplary embodiment, the cleaning solution is formed a cleaning detergent and water. In one embodiment, the cleaning solution includes cleaning detergent of up to about 20 percent by weight of the composition. Moreover, the cleaning solution includes any cleaning detergent that enables the systems and methods to function as described herein. In one embodiment, the cleaning detergent is generally effective at degreasing and decoking, and contains an organic and alkaline solution of up to about 20 percent by weight of the detergent. In some embodiments, the organic and alkaline solution includes alkyl and aromatic amines, non-ionic, anionic, and cationic surfactants, and either a polycyclic aromatic hydrocarbon or di-propylene glycol methyl ether.

In an alternative embodiment, the cleaning solution includes at least one of citric acid or glycolic acid. An example cleaning solution that includes at least one of citric acid or glycolic acid includes, but is not limited to, Citranox® ("Citranox" is a registered trademark of Alconox, Inc., of White Plains, NY). In some embodiments, the cleaning solution also includes at least one of a foaming agent, surfactants, or other suitable additives. In a further alternative embodiment, the cleaning solution includes an organic solvent, such as a Turco® 8226 cleaning solution.

Figure 3:
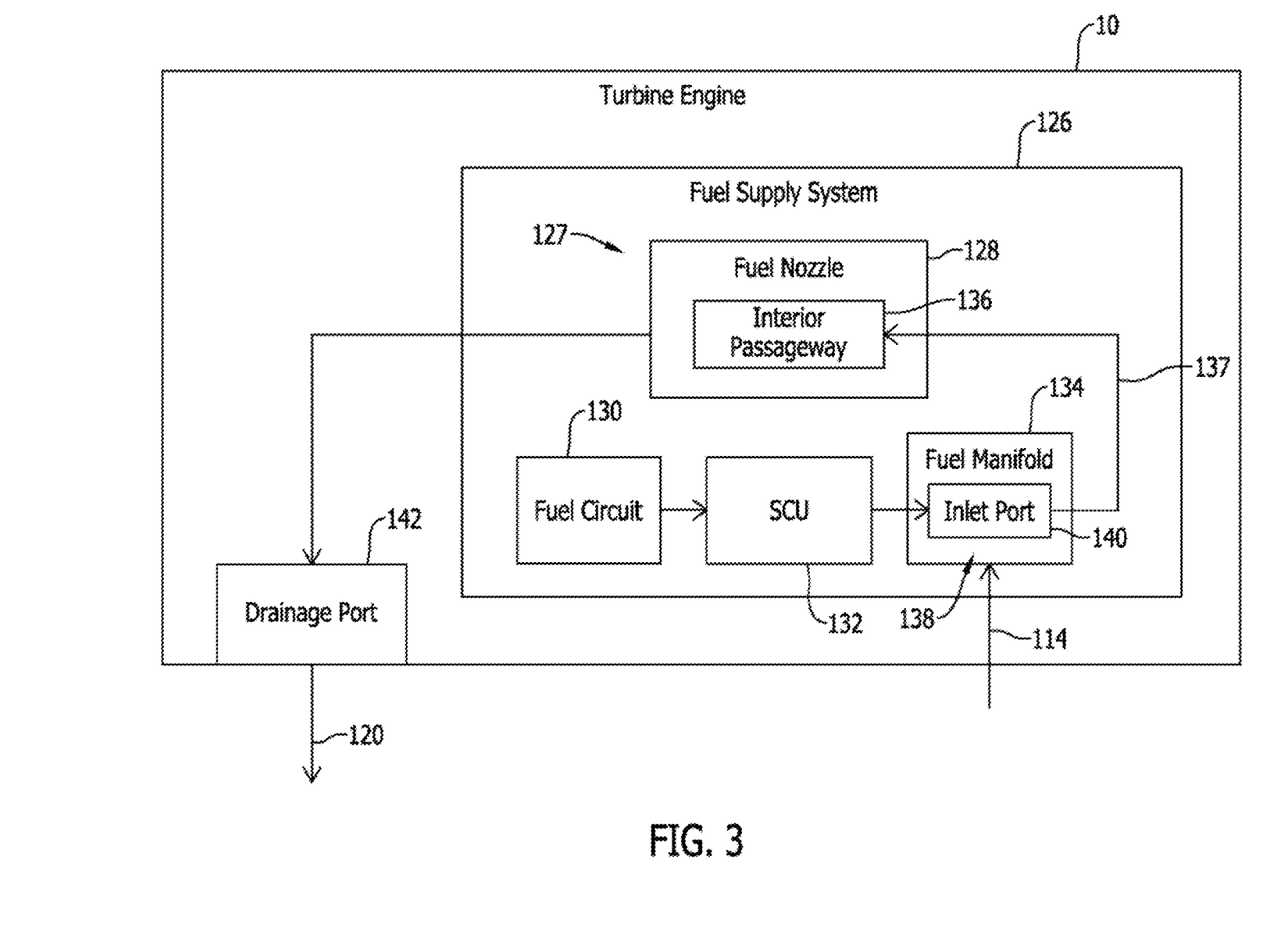
FIG. 3 is a box diagram illustrating the fluid delivery system shown in FIG. 2 providing fluid to a component of the turbine engine shown in FIG. 1 from an exemplary access point.
Figure 4:
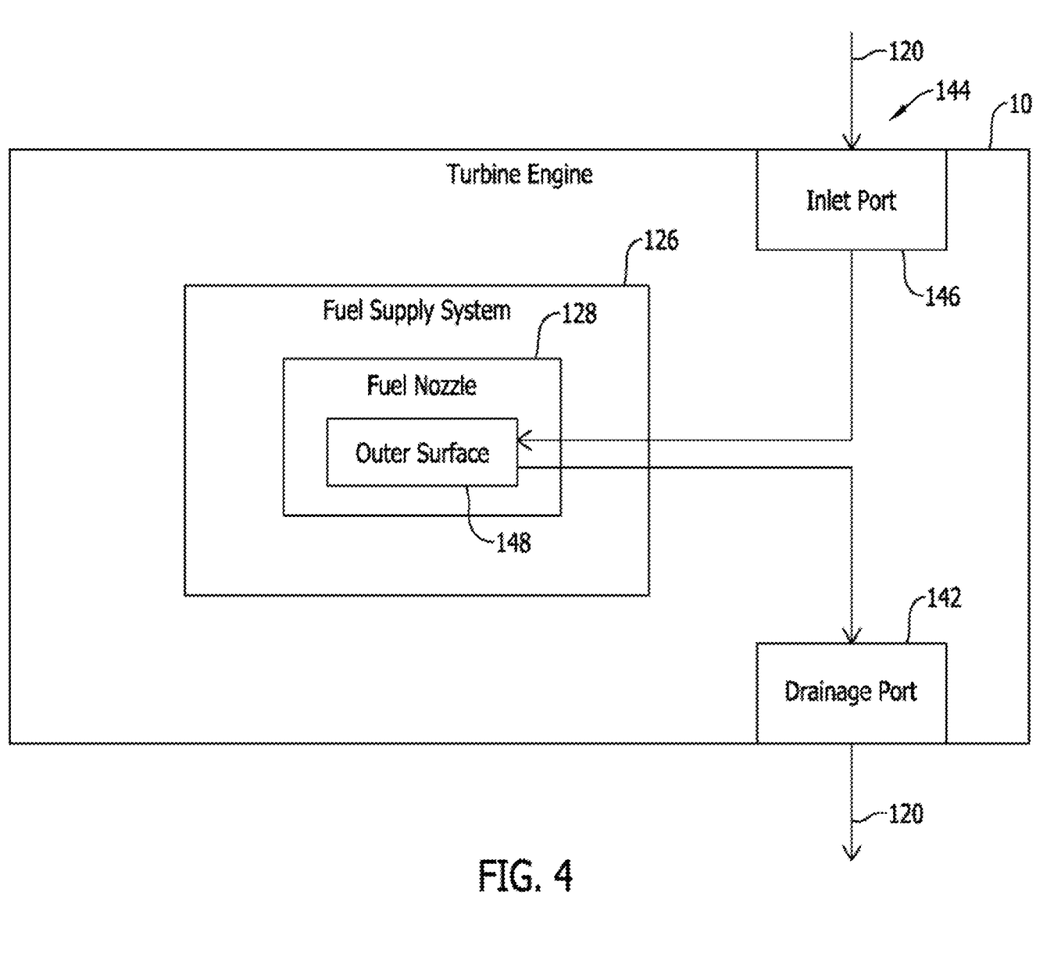
FIG. 4 is a box diagram illustrating the fluid delivery system shown in FIG. 2 providing fluid to the component of the turbine engine shown in FIG. 1 from an alternative access point.
Figure 5:
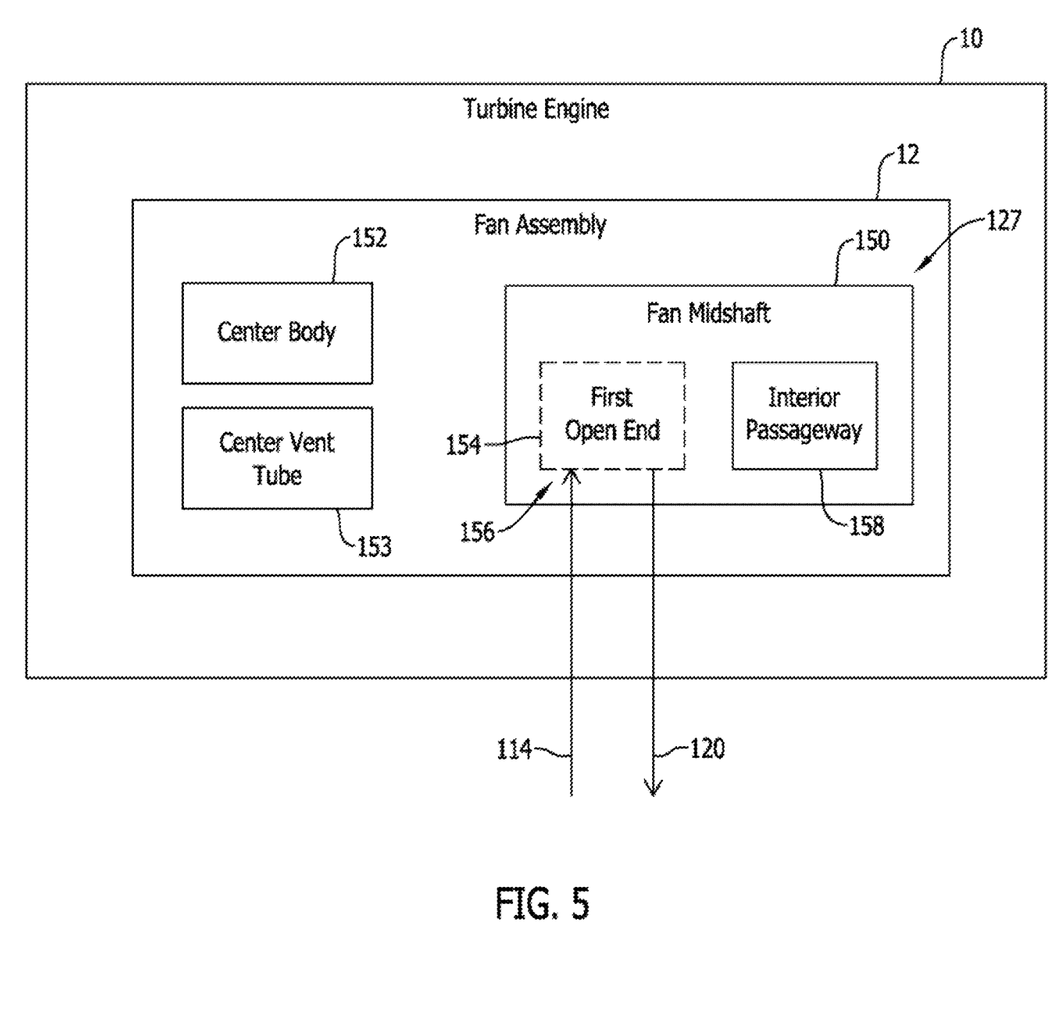
FIG. 5 is a box diagram illustrating the fluid delivery system shown in FIG. 2 providing fluid to an alternative component of the turbine engine shown in FIG. 1 from an exemplary access point.

FIGS. 3-5 are box diagrams illustrating fluid delivery system 100 (shown in FIG. 2) providing solution to a component of turbine engine 10 from an access point. In the exemplary embodiment, turbine engine 10 includes a fuel supply system 126 including a component 127, such as at least one fuel nozzle 128. Fuel supply system 126 also includes a fuel circuit 130, a split control unit (SCU) 132 coupled in selective flow communication with fuel circuit 130, and a fuel manifold 134 coupled in flow communication SCU 132. In operation, fuel is channeled towards fuel nozzle 128 from fuel circuit 130, through SCU 132, through fuel manifold 134, and towards an interior passageway 136 of fuel nozzle 128. As noted above, coked hydrocarbons sometimes form on a component within turbine engine 10 after prolonged use. In the exemplary embodiment, the component is a component of fuel supply system 126 or a fan midshaft, as will be described in more detail below.

Referring to FIG. 3, a method of cleaning a component, such as fuel nozzle 128, within turbine engine 10 is described herein. In the exemplary embodiment, fuel nozzle 128 has coked hydrocarbons formed thereon, such as within interior passageway 136 or on an outer surface of fuel nozzle 128. The method includes disassembling a first portion of turbine engine 10 to provide a flow path 137 to interior passageway 136 of fuel nozzle 128 from an access point 138. More specifically, fuel manifold 134 is disassembled by disconnecting SCU 132 from fuel manifold 134 to define inlet port 140 and access point 138 at fuel manifold 134. A flow of cleaning solution is then discharged towards interior passageway 136 from access point 138, where the cleaning solution is configured to remove the coked hydrocarbons from fuel nozzle 128. For example, in the exemplary embodiment, discharge line 114 of fluid delivery system 100 (shown in FIG. 2) is connected to fuel manifold 134 at inlet port 140, and fluid delivery system 100 is actuated to discharge cleaning solution towards turbine engine 10.

In one embodiment, the flow of cleaning solution is discharged in at least one pulsed interval having a predetermined discharge time. For example, the flow of cleaning solution is discharged in at least a first pulsed interval and a second pulsed interval, where a predetermined residence time is defined between the first pulsed interval and the second pulsed interval. Introducing the cleaning solution into turbine engine 10 in the first pulsed interval and then allowing a predetermined residence time to elapse before discharging the second pulsed interval facilitates allowing the cleaning solution of the first pulsed interval to settle and interact with the coked hydrocarbons formed on fuel nozzle 128. The second pulsed interval is then discharged after the predetermined residence time has elapsed such that the cleaning solution within turbine engine 10 is refreshed. Alternatively, a flow of rinsing solution is discharged into turbine engine 10 after the predetermined residence time has elapsed after the first pulsed interval.

The predetermined discharge time and the predetermined residence time may be of any duration that enables the systems and methods to function as described herein. In one embodiment, the predetermined discharge time is defined within a range between about 5 seconds and about 120 seconds. In addition, in one embodiment, the predetermined residence time is defined within a range between about 2 minutes and about 30 minutes.

In the exemplary embodiment, the flow of cleaning solution is channeled through inlet port 140, through fuel manifold 134, through interior passageway 136 of fuel nozzle 128, and is then discharged from fuel nozzle 128. The method further includes disassembling a second portion of turbine engine 10 to define a drainage port 142 therein. Drainage port 142 is coupled in flow communication with fuel nozzle 128 such that the solution channeled into turbine engine 10 is drained from turbine engine 10 through drainage port 142. In one embodiment, drainage port 142 is defined by uninstalling at least one ignitor plug (not shown) from turbine engine 10, where the at least one ignitor plug is located at about a 6 o'clock position within turbine engine 10. As such, the solution is gravity drained from turbine engine 10. More specifically, the solution is discharged from fuel nozzle 128 and into a combustor dome, is drained through air holes in the combustor dome into a combustor case, and is then drained from the combustor case through drainage port 142. Moreover, in the exemplary embodiment, receiving line 120 of fluid delivery system 100 is coupled to turbine engine 10 at drainage port 142 such that used cleaning solution is recycled to fluid delivery system 100, as described above.

The method further includes discharging a flow of rinsing solution towards interior passageway 136 of fuel nozzle 128 from access point 138. More specifically, fluid delivery system 100 is actuated as described above to facilitate discharging the flow of rinsing solution through discharge line 114 rather than the flow of cleaning solution. The rinsing solution is then drained through drainage port 142.

Referring to FIG. 4, the method includes disassembling a portion of turbine engine 10 to provide direct access to fuel nozzle 128 having coked hydrocarbons formed thereon. More specifically, turbine engine 10 is disassembled to define an access point 144 at an inlet port 146 of turbine engine 10. For example, inlet port 146 is defined by uninstalling at least one ignitor plug from turbine engine 10, or by uninstalling a borescope cover from turbine engine 10. The flow of cleaning solution is then discharged towards fuel nozzle 128 from access point 144, such that the cleaning solution impinges against an outer surface 148 of fuel nozzle 128. In some embodiments, the cleaning solution enters fuel nozzle 128 through an opening defined therein such that coked hydrocarbons are also removed the interior of fuel nozzle 128.

Referring to FIG. 5, the method includes disassembling fan assembly 12 of turbine engine 10 to provide access to component 127 installed therein. For example, in the exemplary embodiment, fan assembly 12 includes a fan midshaft 150 and a center body 152 and a center vent tube 153 coupled to fan midshaft 150. Disassembling fan assembly 12 includes removing center body 152 from fan midshaft 150 to define a first open end 154 in fan midshaft 150, and removing center vent tube 153 from fan midshaft 150 to provide access to an interior of fan midshaft 150. More specifically, first open end 154 defines an access point 156 to an interior passageway 158 of fan midshaft 150, which has coked hydrocarbons formed therein. The cleaning solution is then discharged into interior passageway 158, and a volume of interior passageway 158 is filled with an amount of cleaning solution in the form of an aerated foam. Interior passageway 158 is filled with the amount of cleaning solution for a predetermined residence time that facilitates allowing the cleaning solution to interact with the coked hydrocarbons formed therein, ranging effectively from 30 minutes to 8 hours. The cleaning solution is then drained through first open end 154 and rinsing solution is discharged into interior passageway 158 followed by mechanical removal of additional coking products lifted from the fan mid shaft inner diameter employing an articulating brush comprised of nylon.

Figure 6:
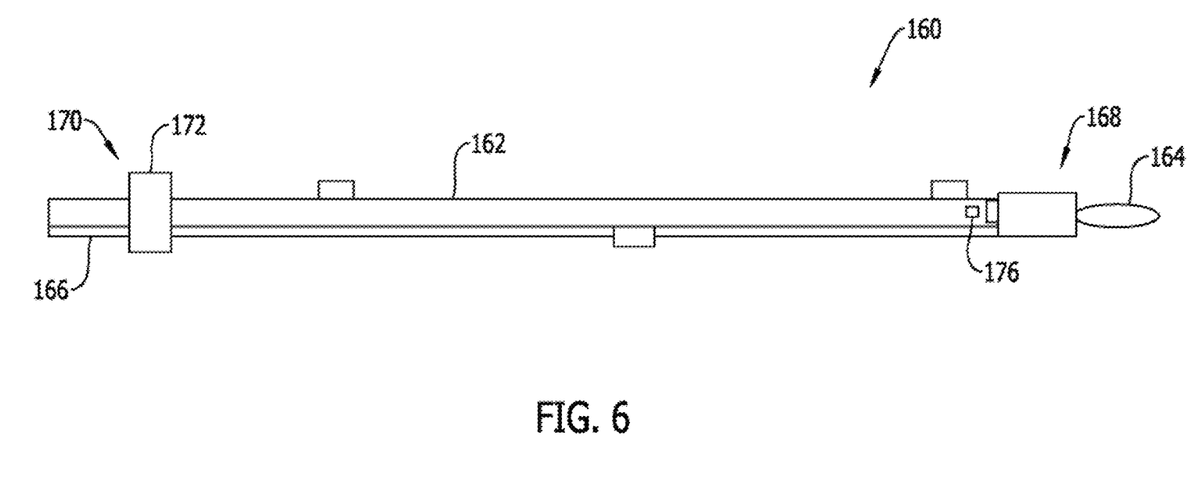
FIG. 6 is a schematic illustration of an exemplary sealing and discharge assembly in a first operational mode that may be used when delivering fluid to the component shown in FIG. 5.
Figure 7:
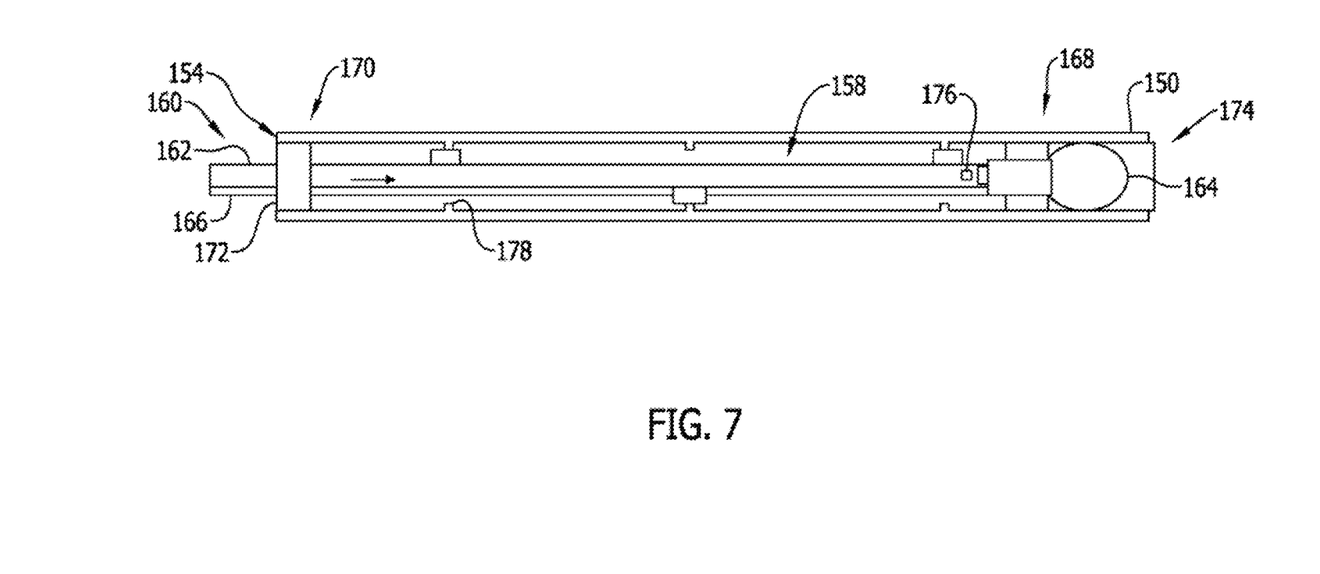
FIG. 7 is a schematic illustration of the sealing and discharge assembly shown in FIG. 6 in a second operational mode.

FIG. 6 is a schematic illustration of an exemplary sealing and discharge assembly 160 in a first operational mode that may be used when delivering fluid to fan midshaft 150, and FIG. 7 is a schematic illustration of sealing and discharge assembly 160 in a second operational mode. In the exemplary embodiment, sealing and discharge assembly 160 includes a discharge shaft 162, an inflatable plug 164, and a supply line 166 coupled in flow communication with inflatable plug 164. Discharge shaft 162 includes a first end 168 and a second end 170. Inflatable plug 164 is coupled to discharge shaft 162 at first end 168, and a sealing cap 172 is coupled to discharge shaft 162 at second end 170.

Referring to FIG. 7, fan midshaft 150 includes first open end 154 and a second open end 174. When in the first operational mode, inflatable plug 164 is deflated to a size such that sealing and discharge assembly 160 is insertable through first open end 154, and such that inflatable plug 164 is positionable within interior passageway 158 proximate second open end 174. Referring to FIG. 7, the inflatable plug 164 is then actuated from the first operational mode to the second operational mode, where the inflatable plug 164 seals second open end 174 when in the second operational mode. More specifically, fluid is supplied to inflatable plug 164 via supply line 166 to inflate inflatable plug 164 to a size that facilitates sealing second open end 174. Second open end 174 is sealed prior to discharging the flow of cleaning solution towards interior passageway 158.

When sealing and discharge assembly 160 is fully inserted within interior passageway 158, sealing cap 172 couples to fan midshaft 150 with an interference fit to facilitate sealing first open end 154. Discharge shaft 162 is coupled in flow communication with discharge line 114 (shown in FIG. 2), for example, and includes at least one discharge outlet 176 defined therein. As such, when sealed, interior passageway 158 is provided with cleaning solution discharged from discharge outlet 176 to facilitate removing coked hydrocarbons formed therein.

In one embodiment, a volume of interior passageway 158 is filled with an amount of the cleaning solution, and the amount of cleaning solution is held within interior passageway 158 for a predetermined residence time. The predetermined residence time is defined within a range between about 30 minutes and about 8 hours. In some embodiments, the cleaning solution includes a foaming agent, which facilitates filling the volume of interior passageway 158 and enabling the cleaning solution to interact with coked hydrocarbons on the surface of fan midshaft 150 without being directly applied thereto.

After the predetermined residence time has elapsed, interior passageway 158 is drained through at least one of first open end 154 and second open end 174. In some embodiments, the method includes suctioning the cleaning solution from interior passageway 158. Moreover, in the exemplary embodiment, fan midshaft 150 includes at least one annular member 178 positioned within interior passageway 158. When draining solution from interior passageway 136, the solution may pool in a space defined between adjacent annular members 178. As such, in one embodiment, suctioning solution from interior passageway 158 includes providing a directed suction force to the space defined between adjacent annular members 178 to facilitate removing pooled solution from interior passageway 158. Fan midshaft 150 is then cleaned mechanically and rinsed, or a second application of cleaning solution is provided.

Figure 8:
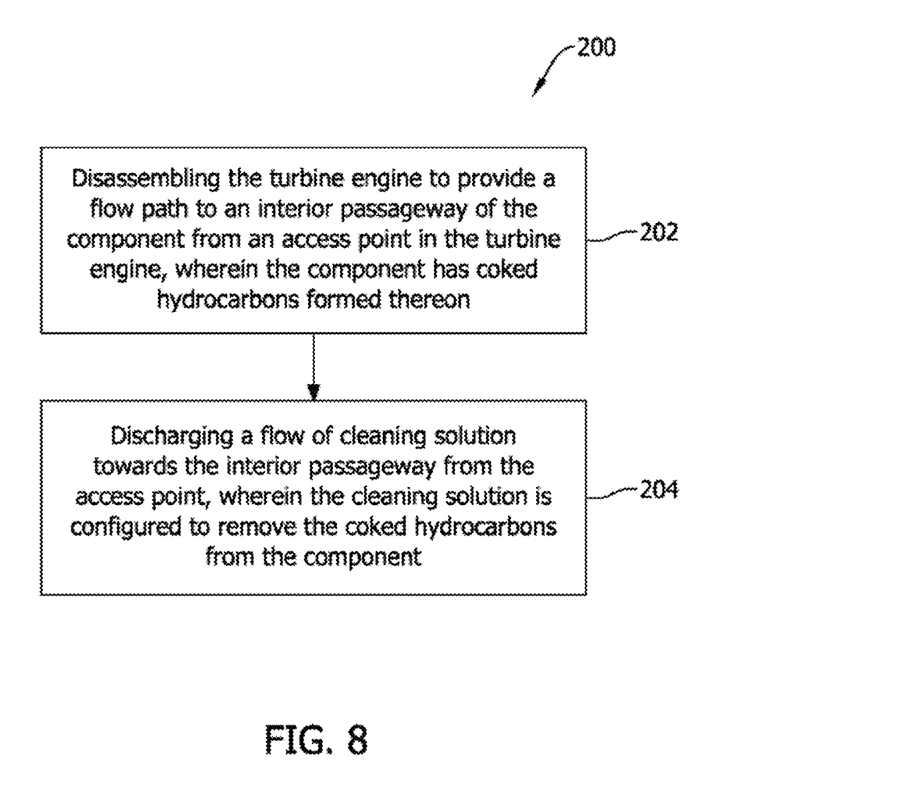
FIG. 8 is a flow diagram illustrating an exemplary method of cleaning a component within a turbine engine, in accordance with a first embodiment of the disclosure.
Figure 9:
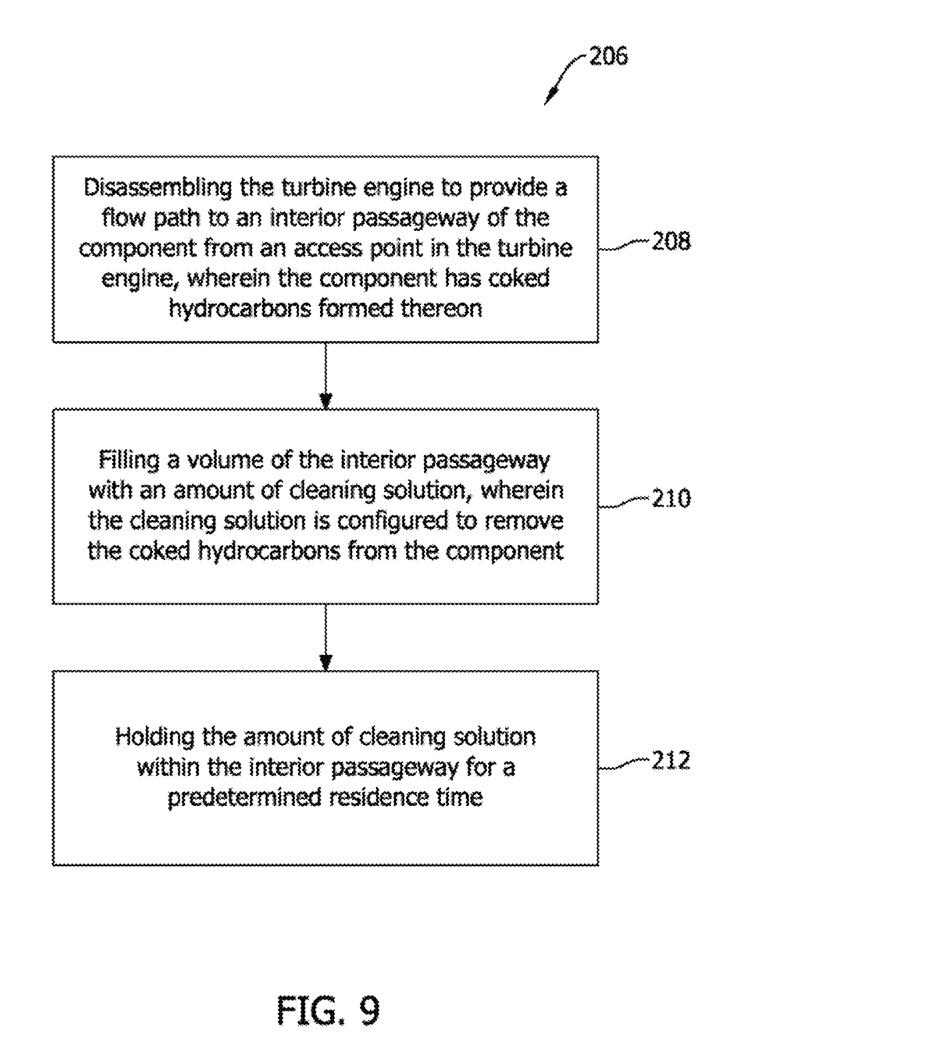
FIG. 9 is a flow diagram illustrating an exemplary method of cleaning a component within a turbine engine, in accordance with a second embodiment of the disclosure.
Figure 10:
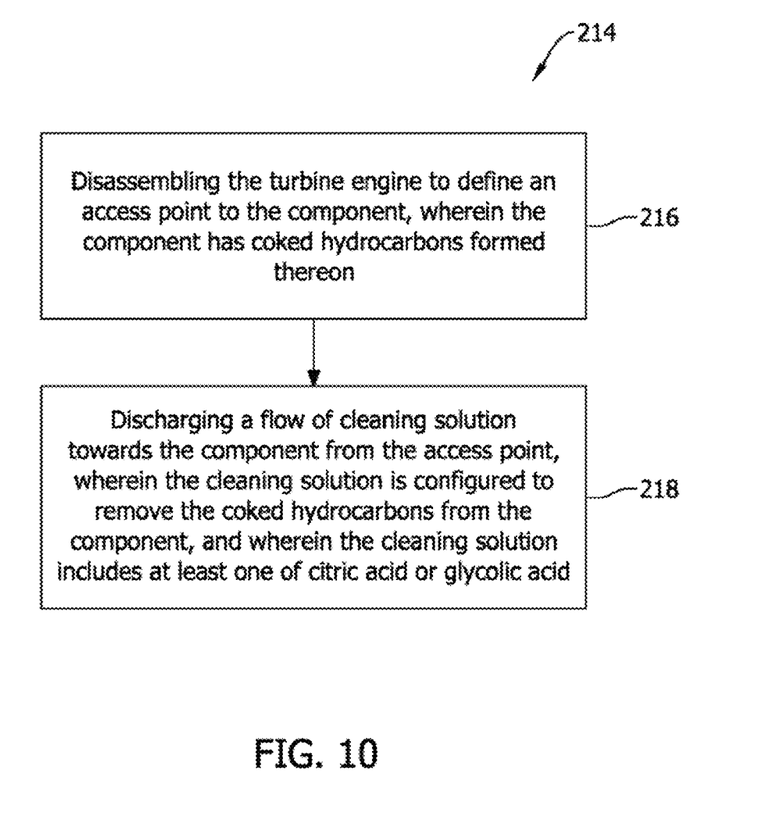
FIG. 10 is a flow diagram illustrating an exemplary method of cleaning a component within a turbine engine, in accordance with a third embodiment of the disclosure.

FIGS. 8-10 are flow diagrams illustrating exemplary methods of cleaning a component within turbine engine 10. Referring to FIG. 8, a method 200 includes disassembling 202 turbine engine 10 to provide a flow path 137 to interior passageway 136 of component 127 from access point 138 in turbine engine 10. Component 127 has coked hydrocarbons formed thereon. Method 200 further includes discharging 204 a flow of cleaning solution towards interior passageway 136 from access point 138. The cleaning solution is configured to remove the coked hydrocarbons from component 127.

Referring to FIG. 9, a method 206 includes disassembling 208 turbine engine 10 to provide a flow path to interior passageway 158 of component 127 from access point 156 in turbine engine 10. Component 127 has coked hydrocarbons formed thereon. Method 206 further includes filling 210 a volume of interior passageway 158 with an amount of cleaning solution, wherein the cleaning solution is configured to remove the coked hydrocarbon from the component, and holding 212 the amount of cleaning solution within interior passageway 158 for a predetermined residence time.

Referring to FIG. 10, a method 214 includes disassembling 216 turbine engine 10 to define access point 144 to component 127. Component 127 has coked hydrocarbons formed thereon. Method 214 further includes discharging 218 a flow of cleaning solution towards component 127 from access point 144. The cleaning solution is configured to remove the coked hydrocarbons from component 127, and the cleaning solution includes at least one of citric acid or glycolic acid.

An exemplary technical effect of the assembly and methods described herein includes at least one of: (a) cleaning internal components of a turbine engine while coupled to an airframe; (b) cleaning internal components of the turbine engine in a quick and efficient manner; and (c) reducing an amount of time for cleaning and returning a cleaned turbine engine to service.

Exemplary embodiments of a cleaning system for use with a turbine engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with a fuel nozzles or a fan section of a turbine engine. Rather, the exemplary embodiment can be implemented and utilized in connection with many applications where removing coked hydrocarbons from an object is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of cleaning a fuel supply system within a turbine engine, said method comprising: disassembling a portion of the fuel supply system when the turbine engine is coupled to an airframe to define an access point in a fuel manifold, the access point in fluid communication with the fuel manifold and an interior passageway of a fuel nozzle, wherein the fuel nozzle has coked hydrocarbons formed thereon as a result of fuel decomposition; and discharging a flow of a cleaning solution from a cleaning tank that is coupled to the fuel manifold via the access point, through the fuel manifold, and from the fuel manifold into the interior passageway of the fuel nozzle from the access point, wherein the cleaning solution is configured to remove the coked hydrocarbons from the interior passageway of the fuel nozzle, and wherein the cleaning solution includes a solvent to dissolve the coked hydrocarbons; discharging the flow of the cleaning solution from the fuel nozzle and into a combustor; draining the cleaning solution through air holes in the combustor into a combustor case; and draining the cleaning solution from the combustor case through a drainage port.

2. The method of claim 1, wherein disassembling a portion of the turbine engine comprises disassembling the turbine engine without removing the fuel nozzle from the turbine engine.

3. The method of claim 1, wherein the solvent is an organic solvent comprising an aromatic hydrocarbon.

4. The method of claim 3, wherein the solvent further comprises a surfactant.

5. The method of claim 1 further comprising:
defining an inlet port by disassembling the fuel manifold, wherein the inlet port defines the access point; and
discharging the flow of cleaning solution through the inlet port into the fuel manifold and towards the fuel nozzle.

6. The method of claim 5, wherein the fuel manifold is disassembled by disconnecting a split control unit from the fuel manifold to define the inlet port.

7. The method of claim 1, wherein the flow of cleaning solution is discharged in at least one pulsed interval having a predetermined discharged time.

8. The method of claim 1, wherein the flow of cleaning solution is discharged in at least a first pulsed interval and a second pulsed interval, where a predetermined residence time is defined between the first pulsed interval and the second pulsed interval.

9. The method of claim 1, further comprising discharging a flow of rinsing solution towards the fuel nozzle from the access point.

10. The method of claim 1, wherein disassembling the portion of the turbine engine provides a flow path from the access point to an interior passageway of the fuel nozzle.

11. The method of claim 1, wherein the cleaning solution enters the fuel nozzle through an opening defined therein such that coked hydrocarbons are also removed from an interior of the fuel nozzle.

12. The method of claim 1, wherein the method further comprises:
filling a volume of the fuel nozzle with an amount of the cleaning solution; and
holding the amount of the cleaning solution within the fuel nozzle for a predetermined residence time.

13. The method of claim 1, defining a second access point by uninstalling at least one ignitor plug by uninstalling at least one ignitor from the turbine engine or by uninstalling a borescope cover from the turbine engine.

14. The method of claim 13, discharging a second flow of cleaning solution towards and outer surface of the fuel nozzle from the second access point.

15. The method of claim 1, further comprising:
disassembling another portion of the turbine engine to define a drainage port therein, wherein the cleaning solution is drained from the turbine engine through the drainage port.

16. The method of claim 15, further comprising:
discharging a flow of rinsing solution towards the fuel nozzle from the access point; and
draining the rinsing solution from the turbine engine through the access point.

* * * * *

UNITED STATES PATENT AND TRADEMARK OFFICE
CERTIFICATE OF CORRECTION

PATENT NO. : 12,435,643 B2
APPLICATION NO. : 18/135378
DATED : October 7, 2025
INVENTOR(S) : Michael Robert Millhaem et al.

It is certified that error appears in the above-identified patent and that said Letters Patent is hereby corrected as shown below:

In the Claims

In Column 11, Claim 5, Line 35, delete "claim 1" and insert -- claim 1, --, therefor.

In Column 12, Claim 7, Line 3, delete "discharged" and insert -- discharge --, therefor.

In Column 12, Claim 14, Line 30, delete "and" and insert -- an --, therefor.

Signed and Sealed this
Third Day of February, 2026

John A. Squires
*Director of the United States Patent and Trademark Office*